(12) United States Patent
Zhu et al.

(10) Patent No.: US 11,283,641 B2
(45) Date of Patent: Mar. 22, 2022

(54) METHOD, APPARATUS, DEVICE, SYSTEM AND STORAGE MEDIUM FOR CONTROLLING SMART HOME

(71) Applicant: BAIDU ONLINE NETWORK TECHNOLOGY (BEIJING) CO., LTD., Beijing (CN)

(72) Inventors: Kaihua Zhu, Beijing (CN); Yuan Tian, Beijing (CN); Xuejian Zheng, Beijing (CN)

(73) Assignees: BAIDU ONLINE NETWORK TECHNOLOGY (BEIJING) CO., LTD., Beijing (CN); SHANGHAI XIAODU TECHNOLOGY CO. LTD., Shanghai (CN)

( * ) Notice: Subject to any disclaimer, the term of this patent is extended or adjusted under 35 U.S.C. 154(b) by 71 days.

(21) Appl. No.: 16/354,084

(22) Filed: Mar. 14, 2019

(65) Prior Publication Data
US 2019/0327106 A1    Oct. 24, 2019

(30) Foreign Application Priority Data

Apr. 20, 2018  (CN) .......................... 201810361468.1

(51) Int. Cl.
*H04L 12/28* (2006.01)
*H04L 29/08* (2006.01)
*H04L 67/125* (2022.01)

(52) U.S. Cl.
CPC .......... *H04L 12/282* (2013.01); *H04L 12/283* (2013.01); *H04L 12/2818* (2013.01);
(Continued)

(58) Field of Classification Search
CPC ............... H04L 12/282; H04L 12/2818; H04L 12/2825; H04L 12/2829; H04L 12/283;
(Continued)

(56) References Cited

U.S. PATENT DOCUMENTS 8,773,512 B1 * 7/2014 Rafii ...................... G02B 5/124
348/47
10,637,724 B2 * 4/2020 Johnson .............. H04W 12/062
(Continued)

FOREIGN PATENT DOCUMENTS

| CN | 102608973 A | 7/2012 |
| CN | 102945029 A | 2/2013 |

(Continued)

OTHER PUBLICATIONS

The Japanese Examination Report of corresponding Japanese application No. 2019-047333, dated Dec. 3, 2019.
(Continued)

*Primary Examiner* — Davoud A Zand
*Assistant Examiner* — Adam A Cooney
(74) *Attorney, Agent, or Firm* — J.C. Patents

(57) ABSTRACT

Embodiments of the disclosure provide a method, an apparatus, a device, a system, and a storage medium for controlling a smart home, the method includes: receiving first information sent by a terminal accessory; sending the first information to a cloud server, so that the cloud server generates a control instruction according to the first information; receiving the control instruction sent by the cloud server, and controlling the smart home according to the control instruction, thereby improving the utilization rates of the smart homes.

18 Claims, 11 Drawing Sheets

(52) U.S. Cl.
CPC ...... *H04L 12/2825* (2013.01); *H04L 12/2829* (2013.01); *H04L 67/125* (2013.01)

(58) Field of Classification Search
CPC .............. H04L 67/125; H04L 12/2834; G05B 2219/2642
See application file for complete search history.

(56) References Cited

U.S. PATENT DOCUMENTS

| | | | | |
|---|---|---|---|---|
| 2002/0052138 | A1* | 5/2002 | Janik | H04L 12/282 439/535 |
| 2014/0098247 | A1* | 4/2014 | Rao | H04W 4/20 348/207.1 |
| 2014/0118120 | A1* | 5/2014 | Chen | G08C 17/02 340/12.5 |
| 2014/0252091 | A1* | 9/2014 | Morse | G06Q 10/087 235/385 |
| 2016/0139574 | A1* | 5/2016 | Lee | G05B 15/02 700/275 |
| 2016/0226823 | A1 | 8/2016 | Ansari et al. | |
| 2016/0321891 | A1* | 11/2016 | Zheng | G08B 25/10 |
| 2016/0323977 | A1* | 11/2016 | Sun | H04L 12/2816 |
| 2017/0188437 | A1* | 6/2017 | Banta | H04R 1/028 |
| 2018/0063249 | A1* | 3/2018 | Nguyen | H04L 67/42 |
| 2018/0152557 | A1* | 5/2018 | White | G10L 15/26 |
| 2019/0020493 | A1* | 1/2019 | Arling | G06F 3/167 |
| 2019/0028759 | A1* | 1/2019 | Yuan | H04N 21/43615 |
| 2019/0028829 | A1* | 1/2019 | R | G06T 7/62 |
| 2019/0146442 | A1* | 5/2019 | Cirino | G01N 33/0073 700/9 |
| 2019/0199545 | A1* | 6/2019 | Ard | G06F 3/167 |
| 2019/0245712 | A1* | 8/2019 | Yu | H04L 12/4625 |
| 2019/0268177 | A1* | 8/2019 | Li | G10L 15/30 |
| 2019/0295547 | A1* | 9/2019 | Gandhi | H04L 63/08 |
| 2019/0296550 | A1* | 9/2019 | Fan | G05B 15/02 |

FOREIGN PATENT DOCUMENTS

| | | |
|---|---|---|
| CN | 205958953 U | 2/2017 |
| CN | 106896743 A | 6/2017 |
| CN | 107578779 A | 1/2018 |
| JP | 2003-153355 A | 5/2003 |
| JP | 2011-155593 A | 8/2011 |
| JP | 2012-247928 A | 12/2012 |
| JP | 2013-179446 A | 9/2013 |
| TR | 2014/12864 | 11/2014 |

OTHER PUBLICATIONS

The Chinese Second Examination Report of corresponding Chinese application No. 201810361468.1, dated Jun. 6, 2019.
The Chinese First Examination Report of corresponding Chinese application No. 201810361468.1, dated Mar. 26, 2019.

* cited by examiner

METHOD, APPARATUS, DEVICE, SYSTEM AND STORAGE MEDIUM FOR CONTROLLING SMART HOME

CROSS-REFERENCE TO RELATED APPLICATIONS

This application claims priority to Chinese Patent Application No. 201810361468.1, filed on Apr. 20, 2018, which is hereby incorporated by reference in its entirety.

TECHNICAL FIELD

Embodiments of the present disclosure relate to the field of smart home technologies, and in particular, to a method, an apparatus, a device, a system, and a storage medium for controlling a smart home.

BACKGROUND

A smart home is a product of "Internet+", which has become an important part in people's lives.

At present, smart homes include: Artificial Intelligence (AI) smart homes and non-AI smart homes. Among them, AI smart homes may be, for example, a smart refrigerator, a smart air conditioner with face recognition or gesture recognition function, a smart speaker with a voice function, etc., non-AI smart homes may be, for example, a television controlled by a remote control. In short, the intelligence levels of each smart home are different, with the increase of smart homes, people often ignore the intelligence of the smart homes, leaving many smart functions of the smart homes idle.

Therefore, the prior art has a problem that a utilization rate of the smart home is low, which will be an urgent problem to be solved in embodiments of the present disclosure.

SUMMARY

Embodiments of the present disclosure provide a method, an apparatus, a device, a system, and a storage medium for controlling a smart home. The terminal can be used as a hub of a system for controlling a smart home which includes a terminal accessory, a terminal, a cloud server, and a smart home, and can implement unified control on the smart homes, thereby improving the utilization rates of the smart homes.

In a first aspect, embodiments of the present disclosure provide a method for controlling a smart home, including: receiving first information sent by a terminal accessory; sending the first information to a cloud server, so that the cloud server generates a control instruction according to the first information; receiving the control instruction sent by the cloud server and controlling the smart home according to the control instruction.

The beneficial effects of the embodiments of the present disclosure include: in the embodiments of the present disclosure, the terminal can be used as a hub of a system for controlling a smart home which includes a terminal accessory, a terminal, a cloud server, and a smart home, and can implement unified control of the smart homes, thereby improving the utilization rates of the smart homes.

Optionally, the first information is voice information and/or image information; the image information is information about a gesture image and/or information about a facial image shot by the terminal accessory.

Optionally, where the controlling the smart home according to the control instruction includes: sending the control instruction to the terminal accessory, so that the terminal accessory controls the smart home according to the control instruction. Or, where the controlling the smart home according to the control instructions includes: turning the smart home on or off.

That is, in the embodiments of the present disclosure, the terminal can directly or indirectly control the smart home, thereby improving the control flexibility by the terminal.

Optionally, a connection between the terminal accessory and the terminal is a wired connection or a wireless connection.

Optionally, the wireless connection is a Bluetooth connection.

Optionally, the method further includes: reading Bluetooth information of the terminal accessory, and connecting to the terminal accessory according to the Bluetooth information of the terminal accessory. Thereby, an automatic connection between the terminal and the terminal accessory is realized, thus improving the connection efficiency.

Optionally, the method further includes: receiving second information sent by the terminal accessory; sending the second information to the cloud server, so that the cloud server generates information to be displayed about the smart home according to the second information; receiving the information to be displayed, and displaying the information to be displayed, thus improving the utilization rates of the smart homes.

Optionally, the method further includes: receiving third information sent by the terminal accessory; sending the third information to the cloud server, so that the cloud server generates information to be broadcasted about the smart home according to the third information; receiving the information to be broadcasted, and sending the information to be broadcasted to the terminal accessory, so that the terminal accessory plays the information to be broadcasted, thus improving the utilization rates of the smart homes.

The method for controlling the smart home will be introduced from the terminal accessory side, and for the effects thereof, reference can be made to the corresponding effects on the terminal side, and will not be described hereinafter.

In a second aspect, the embodiments of the present disclosure provide a method for controlling a smart home, including: a terminal accessory acquires first information; the terminal accessory sends the first information to a terminal, where the first information is used to generate a control instruction, and the control instruction is used to control the smart home.

Optionally, the first information is voice information and/or image information; the image information is information about a gesture image and/or information about a facial image shot by the terminal accessory.

Optionally, the method further includes: the terminal accessory receives the control instruction sent by the terminal; and the terminal accessory controls the smart home according to the control instruction.

Optionally, where the terminal accessory controls the smart home according to the control instruction includes: if the smart home is a smart home that can be remotely controlled by infrared, controlling the smart home according to the control instruction through an infrared function of the terminal accessory.

Optionally, a connection between the terminal accessory and the terminal is a wired connection or a wireless connection.

Optionally, the wireless connection is a Bluetooth connection.

Optionally, the method further includes: the terminal accessory reads Bluetooth information of the terminal, and connects to the terminal according to the Bluetooth information of the terminal.

Optionally, the method further includes: the terminal accessory acquires second information; the terminal accessory sends the second information to the terminal, where the second information is used to generate information to be displayed about the smart home.

Optionally, the method further includes: the terminal accessory acquires third information; the terminal accessory sends the third information to the terminal, where the third information is used to generate information to be broadcasted about the smart home; the terminal accessory receives the information to be broadcasted sent by the terminal, and plays the information to be broadcasted.

The apparatus embodiments corresponding to the method of the terminal side will be described in the following. For the effects thereof, reference can be made to the corresponding effects on the terminal side, and will not be described hereinafter.

In a third aspect, the embodiments of the present disclosure provide an apparatus for controlling a smart home, including: a receiving module, a sending module, and a controlling module;

the receiving module, configured to receive first information sent by the terminal accessory; the sending module, configured to send the first information to the cloud server, so that the cloud server generates a control instruction according to the first information;

the receiving module, further configured to receive a control instruction sent by the cloud server;

the controlling module, configured to control the smart home according to the control instruction.

The apparatus embodiments corresponding to the method of the terminal accessory side will be described in the following. For the effects thereof, reference can be made to the corresponding effects on the terminal side, and will not be described hereinafter.

In a fourth aspect, the embodiments of the present disclosure provide an apparatus for controlling a smart home, including:

an acquiring module, configured to acquire first information;

a sending module, configured to send the first information to the terminal, where the first information is used to generate a control instruction, and the control instruction is used to control the smart home.

The device embodiments corresponding to the method of the terminal accessory side will be described in the following. For the effects thereof, reference can be made to the corresponding effects on the terminal side, and will not be described hereinafter.

In a fifth aspect, the embodiments of the present disclosure provide a device for controlling a smart home, including: a memory and a processor;

the memory is configured to store computer instructions; the processor is configured to execute the computer instructions stored in the memory to implement the method for controlling a smart home according to the first aspect or the optional implementations of the first aspect.

The device embodiments corresponding to the method of the terminal accessory side may be described in the following. For the effects thereof, reference can be made to the corresponding effects on the terminal side, and will not be described hereinafter.

In a sixth aspect, the embodiments of the present disclosure provide a device for controlling a smart home, including: a memory and a processor;

the memory is configured to store computer instructions; the processor is configured to execute the computer instructions stored in the memory to implement the method for controlling a smart home according to the second aspect or the optional implementations of the second aspect.

In a seventh aspect, the embodiments of the present disclosure provide a storage medium, including: a readable storage medium and computer instructions, where the computer instructions are stored in the readable storage medium; and the computer instructions are used to implement the method for controlling a smart home according to the first aspect or the optional implementations of the first aspect.

In an eighth aspect, the embodiments of the present disclosure provide a storage medium, including: a readable storage medium and computer instructions, where the computer instructions are stored in the readable storage medium; and the computer instructions are used to implement the method for controlling a smart home according to the second aspect or the optional implementations of the second aspect.

In a ninth aspect, the embodiments of the present disclosure provide a program product, where the computer instruction is used to implement the method for controlling a smart home according to the first aspect or the optional implementations of the first aspect.

In a tenth aspect, the embodiments of the present disclosure provide a program product, where the computer instruction is used to implement the method for controlling a smart home according to the second aspect or the optional implementations of the second aspect.

In an eleventh aspect, the embodiments of the present disclosure provide a system for controlling a smart home, including: the device for controlling the smart home according to the fifth aspect, and the device for controlling the smart home according to the sixth aspect.

The embodiments of the disclosure provide a method, an apparatus, a device, a system and a storage medium for controlling a smart home, the method includes: receiving first information sent by a terminal accessory; sending the first information to a cloud server, so that the cloud server generating a control instruction according to the first information; receiving the control instruction sent by the cloud server, and controlling the smart home according to the control instruction. The terminal can be used as a hub of a system for controlling a smart home which includes a terminal accessory, a terminal, a cloud server, and a smart home, and can realize unified control of the smart homes, thereby improving the utilization rates of the smart homes.

BRIEF DESCRIPTION OF THE DRAWINGS

In order to more clearly illustrate the embodiments of the present disclosure or the technical solutions in the prior art, the drawings used in the embodiments or the prior art description will be briefly described below. Obviously, the drawings in the following description are some of the embodiments of the present disclosure, and other drawings can be obtained according to the drawings without any creative labor for those skilled in the art.

DETAILED DESCRIPTION OF THE EMBODIMENTS

In order to make the objective, the technical scheme and advantages of the present disclosure more clear, the technical solutions in the embodiments of the present disclosure will be clearly and completely described in the following with reference to the accompanying drawings in the embodiments of the present disclosure. It is obvious that the described embodiments are only a part of embodiments of the present disclosure, not all embodiments of the present disclosure. Based on the embodiments of the present disclosure, all the other embodiments obtained by those of ordinary skill without any creative works are within the protection scope of the present disclosure.

At present, smart homes include: AI smart homes and non-AI smart homes. Among them, AI smart homes may be, for example, a smart refrigerator, a smart air conditioner with a face recognition or a gesture recognition function, a smart speaker with a voice function, etc., non-AI smart homes may be, for example, a television controlled by a remote control. In short, the intelligence levels of the smart homes are different, with the increase of smart home, people often ignore the intelligence of the smart homes, leaving many smart functions of the smart homes idle. Therefore, the prior art has a problem that the utilization rate of the smart home is low, which will be an urgent problem to be solved in the embodiments of the present disclosure.

Figure 1A:
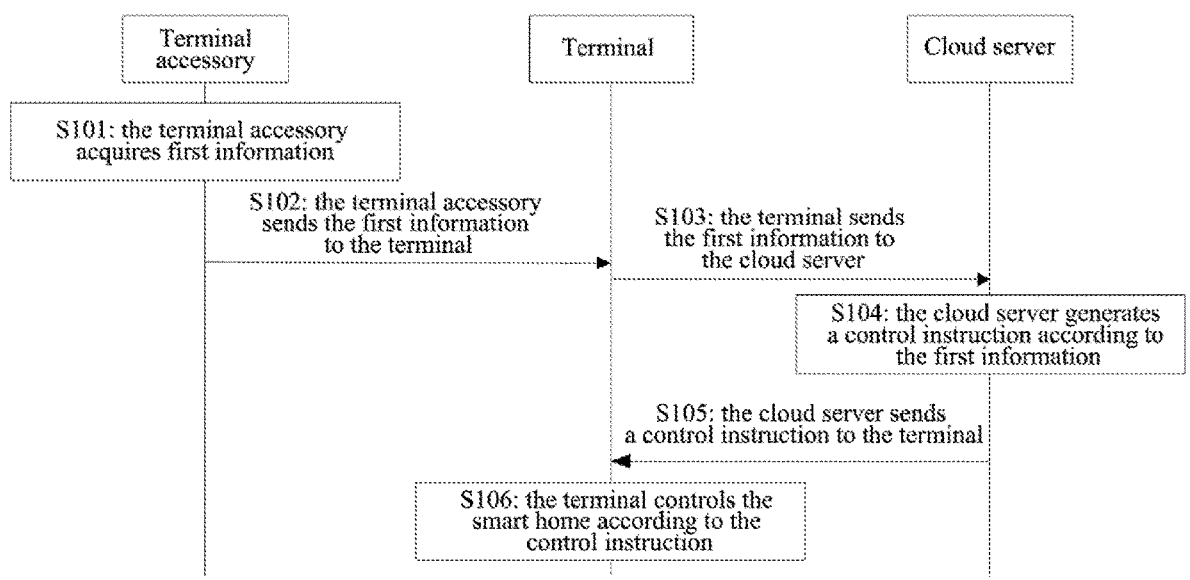
FIG. 1A is an interaction flowchart of a method for controlling a smart home according to an embodiment of the present disclosure.

In order to solve the above technical problem, the embodiments of the present disclosure provide a method, an apparatus, a device, a system, and a storage medium for controlling a smart home. Specifically, FIG. 1A is an interaction flowchart of a method for controlling a smart home according to an embodiment of the present disclosure. The executive subject matters involved in the method are a terminal, a terminal accessory and a cloud server. The terminal may be a mobile phone, a tablet computer, or the like. The terminal accessory has a sound collecting function and a shooting function, its sound collecting function and shooting function are stronger than the sound collecting function and shooting function of the terminal. For example, the terminal accessory has a far-field sound collecting function, but the terminal is usually not suitable for a voice interaction from a far distance. In addition, the terminal accessory can also have an infrared control function, and can also charge the terminal. The terminal accessory can be made into a terminal bracket. Usually, the terminal can be placed on the terminal bracket to charge the terminal while acting as "ears" and "eyes" of the terminal to expand the sound collecting function and shooting function of the terminal. Based on this, the method for controlling the smart home includes the following steps:

Step S101: the terminal accessory acquires first information.

Step S102: the terminal accessory sends the first information to the terminal.

Step S103: the terminal sends the first information to the cloud server.

Step S104: the cloud server generates a control instruction according to the first information.

Step S105: the cloud server sends a control instruction to the terminal.

Step S106: the terminal controls the smart home according to the control instruction.

Specifically, a connection between the terminal accessory and the terminal is a wired connection or a wireless connection. Take the wired connection as an example: both the terminal accessory and the terminal have universal serial bus (USB) interfaces, which can be connected by a USB cable. Take the wireless connection as an example: suppose the terminal accessory is a terminal bracket, when the terminal is placed on the terminal accessory, a near field communication (NFC) module of the terminal can read Bluetooth information configured by the NFC of the terminal accessory, thereby achieving automatic pairing with the terminal accessory. The Bluetooth information includes: a Bluetooth account of the terminal accessory. Alternatively, when the terminal is placed on the terminal accessory, the NFC module of the terminal accessory can read the Bluetooth information configured by the NFC of the terminal, thereby achieving automatic pairing with the terminal accessory. The Bluetooth information includes: a Bluetooth account of the terminal.

Optionally, after the terminal is connected to the terminal accessory, the terminal accessory can activate a wireless charging function, an infrared remote control function, a sound collecting function, and a shooting function.

The terminal can communicate with the cloud server through wireless fidelity (WiFi), a second generation (2G) mobile communication system, a third generation (3G) mobile communication system, a fourth generation (4G) mobile communication system or the like.

The terminal can directly control the smart home through its application (APP), where the smart home may be, for example, a smart air conditioner, a smart refrigerator, etc., and can also indirectly control the smart home through the terminal accessory, for example, control the smart home through the infrared control function of the terminal accessory.

Further, the first information is used by the cloud server to generate a control instruction, where the control instruction is used to control the smart home. Optionally, the first information is voice information and/or image information input by the user to the terminal accessory. The image information is information about a gesture image and/or information about a facial image shot by the terminal accessory. Correspondingly, in step S101, where the terminal accessory acquires the first information specifically includes: the terminal accessory acquires the voice information through the sound collecting function thereof, and/or the terminal accessory acquires the image information through the shooting function.

Figure 1B:
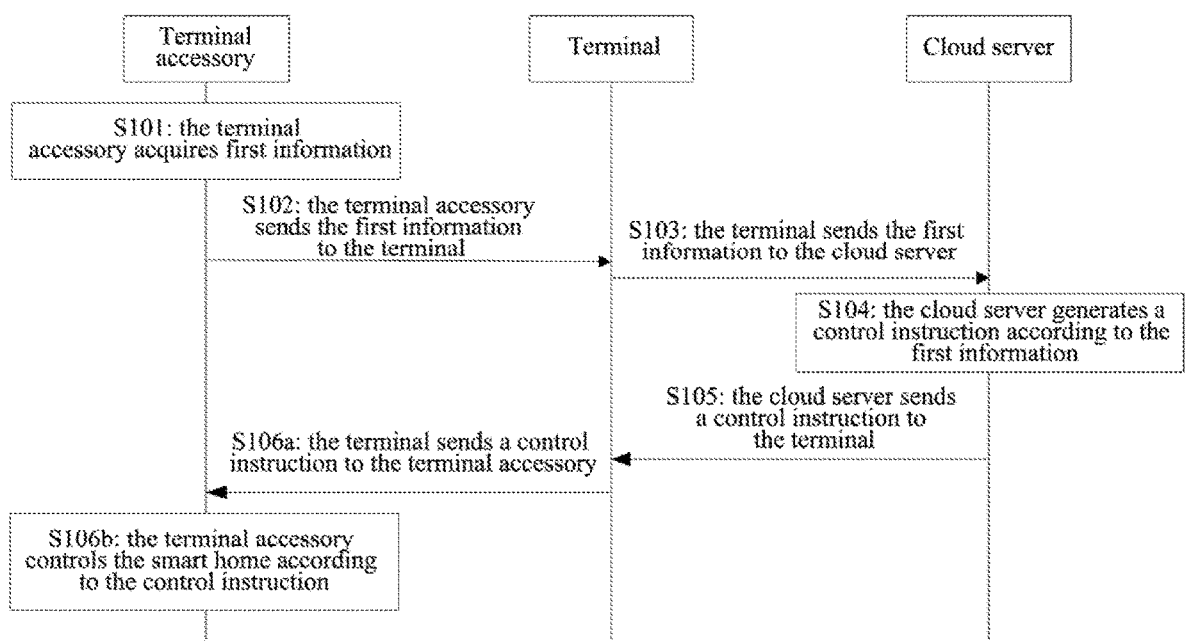
FIG. 1B is an interaction flowchart of a method for controlling a smart home according to another embodiment of the present disclosure.

As described above, the terminal can indirectly control the smart home through the terminal accessory. Specifically, FIG. 1B is an interaction flowchart of a method for controlling a smart home according to another embodiment of the present disclosure. As shown in FIG. 1B, the above step S106 can be implemented by step S106a and step S106b.

Step S106a: the terminal sends a control instruction to the terminal accessory.

Step S106b: the terminal accessory controls the smart home according to the control instruction.

The method for controlling the smart home is further illustrated by several examples below:

optional implementation 1: the terminal accessory obtains voice information, such as "turn on the television", and the terminal accessory transmits the voice information to the terminal. The terminal sends the voice information to the cloud server through WiFi or a wireless communication network, so that the cloud server parses the voice information, generates a control instruction, and sends the control instruction to the terminal, the terminal sends the control instruction to the terminal accessory, and the terminal accessory turns on the television through its infrared function.

Optional implementation 2: the terminal accessory shoots the user's gesture, generates an image about the user's gesture, and transmits the image to the cloud server through the terminal, the cloud server analyzes the image and generates a control instruction, if the image about the gesture is a preset image, the control instruction corresponding to the preset image is used to turn on the television. The cloud server sends the control instruction to the terminal, the terminal sends the control instruction to the terminal accessory, and the terminal accessory turns on the television through its infrared function.

Optional implementation 3: on the one hand, the terminal accessory acquires voice information, such as "turn on the television", and the terminal accessory transmits the voice information to the terminal. The terminal sends voice information to the cloud server through WiFi or a wireless communication network. On the other hand, the terminal accessory shoots the user's gesture, generates an image about the user's gesture, and transmits the image to the cloud server through the mobile phone, the cloud server performs analysis processes on the voice information and the image, generates a control instruction, and sends the control instruction to the terminal, and the terminal sends the control instruction to the terminal accessory, and the terminal accessory turns on the television through its infrared function.

The above three embodiments all take the terminal indirectly controlling the smart terminal as an example, that is, the terminal sends the control instruction to the terminal accessory, and the terminal accessory controls the smart home according to the control instruction. In fact, the terminal can also control the smart home directly.

Optional implementation 4: the terminal accessory acquires voice information, such as "turn on the air conditioner", and the terminal accessory transmits the voice information to the terminal. The terminal sends the voice information to the cloud server through WiFi or a wireless communication network, so that the cloud server parses the voice information, generates a control instruction, and sends the control instruction to the terminal, and the terminal turns on the air conditioner through its APP according to the control instruction.

Optional implementation 5: the terminal accessory shoots the user's gesture, generates an image about the user's gesture, and transmits the image to the cloud server through the terminal, the cloud server performs analysis processes on the image and generates a control instruction, if the image about the gesture is a preset image, the control instruction corresponding to the preset image is used to turn on the air conditioner. The cloud server sends the control instruction to the terminal, and the terminal turns on the air conditioner through its APP according to the control instruction.

Optional implementation 6: on the one hand, the terminal accessory acquires voice information, such as "turn on the air conditioner", and the terminal accessory transmits the voice information to the terminal. The terminal transmits the voice information to the cloud server through WiFi or a wireless communication network. On the other hand, the terminal accessory shoots the user's gesture, generates an image about the user's gesture, and transmits the image to the cloud server through the mobile phone, the cloud server performs analysis processes on the voice information and the image, generates a control instruction, and sends the control instruction to the terminal, the terminal turns on the air conditioner through its APP according to the control instruction.

In summary, in the embodiments of the present disclosure, the terminal can serve as a hub of a system for controlling a smart home which includes a terminal accessory, a terminal, a cloud server, and a smart home, and can implement unified control of the smart homes, thereby improving utilization rates of the smart homes.

Figure 2:
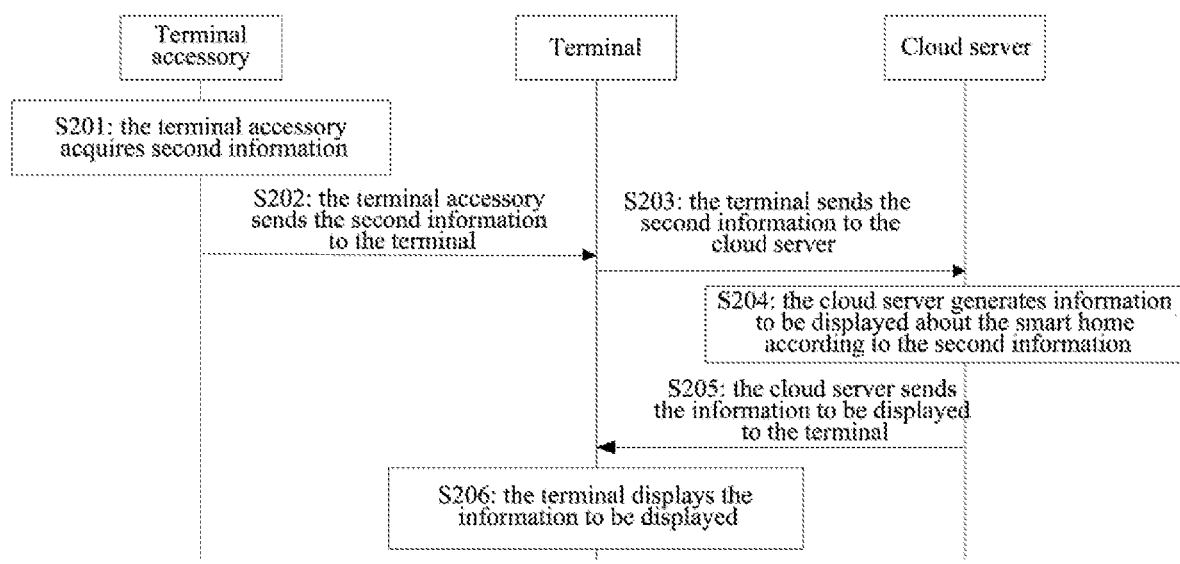
FIG. 2 is an interaction flowchart of a method for controlling a smart home according to another embodiment of the present disclosure.

FIG. 2 is an interaction flowchart of a method for controlling a smart home according to another embodiment of the present disclosure, where the executive subject matters involved in the method are a terminal, a terminal accessory, and a cloud server, and the terminal may be a mobile phone, a tablet computer, or the like. The terminal accessory has a sound collecting function and a shooting function, its sound collecting function and shooting function are stronger than the sound collecting function and shooting function of the terminal. For example, the terminal accessory has a far-field sound collecting function, and the terminal is usually not suitable for a voice interaction from a far distance. In addition, the terminal accessory can also have an infrared control function, and can also charge the terminal. The terminal accessory can be made into a terminal bracket. Usually, the terminal can be placed on the terminal bracket to charge the terminal while acting as "ears" and "eyes" of the terminal to expand the sound collecting function and shooting function of the terminal. Based on this, the method for controlling the smart home includes the following steps:

Step S201: the terminal accessory acquires second information.

Step S202: the terminal accessory sends the second information to the terminal.

Step S203: the terminal sends the second information to the cloud server.

Step S204: the cloud server generates information to be displayed about the smart home according to the second information.

Step S205: the cloud server sends the information to be displayed to the terminal.

Step S206: the terminal displays the information to be displayed.

Specifically, a connection between the terminal accessory and the terminal is a wired connection or a wireless connection. Take the wired connection as an example: both the terminal accessory and the terminal have USB interfaces, which can be connected by a USB cable. Take the wireless connection as an example: suppose the terminal accessory is a terminal bracket, when the terminal is placed on the terminal accessory, the NFC module of the terminal can read Bluetooth information configured by the NFC of the terminal accessory, thereby achieving automatic pairing with the terminal accessory. The Bluetooth information includes: a Bluetooth account of the terminal accessory. Alternatively, when the terminal is placed on the terminal accessory, the NFC module of the terminal accessory can read the Bluetooth information configured by the NFC of the terminal, thereby achieving automatic pairing with the terminal accessory. The Bluetooth information includes: a Bluetooth account of the terminal.

Optionally, after the terminal is connected to the terminal accessory, the terminal accessory can activate a wireless charging function, an infrared remote control function, a sound collecting function, and a shooting function.

The terminal can communicate with the cloud server through WiFi, a 2G mobile communication system, a 3G mobile communication system or a 4G mobile communication system or the like.

The terminal can directly control the smart home through its APP, where the smart home may be, for example, a smart air conditioner, a smart refrigerator, etc., and can also indirectly control the smart home through the terminal accessory, for example, control the smart home through the infrared control function of the terminal accessory.

Further, the second information is used to generate information to be displayed about the smart home. Alternatively, the second information may be voice information and/or image information input by the user to the terminal accessory. The image information is information about a gesture image and/or information about a facial image shot by the terminal accessory. Correspondingly, in step S201, where the terminal accessory acquires the second information specifically includes: the terminal accessory acquires the voice information through the sound collecting function thereof, and/or the terminal accessory acquires the image information through the shooting function.

The method for controlling the smart home is further illustrated by several examples below:

Optional implementation 6: the terminal accessory acquires voice information, such as "what food is currently in the refrigerator", and the terminal accessory transmits the voice information to the terminal. The terminal sends the voice information to the cloud server through WiFi or a wireless communication network, so that the cloud server parses the voice information, generates a control instruction, and sends the control instruction to the smart refrigerator, and the smart refrigerator shoots the food in the refrigerator according to the control instruction and sends the shot images to the terminal, which then displays these images.

In summary, embodiments of the present disclosure provide a method for controlling a smart home, including: the terminal accessory acquires second information; and the terminal accessory sends the second information to the terminal. The terminal sends the second information to the cloud server. The cloud server generates information to be displayed about the smart home according to the second information. The cloud server sends the information to be displayed to the terminal. The terminal displays the information to be displayed, thus improving the utilization rates of the smart homes.

Figure 3:
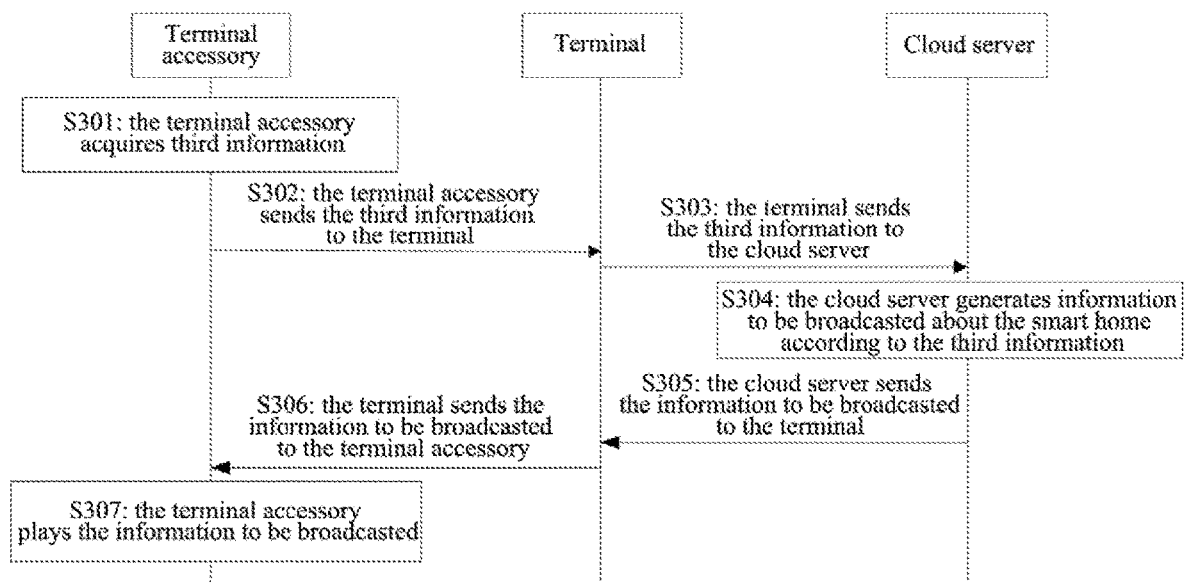
FIG. 3 is an interaction flowchart of a method for controlling a smart home according to still another embodiment of the present disclosure.

FIG. 3 is an interaction flowchart of a method for controlling a smart home according to still another embodiment of the present disclosure, where the executive subject matters involved in the method are a terminal, a terminal accessory, and a cloud server, and the terminal may be a mobile phone, a tablet computer, or the like. The terminal accessory has a sound collecting function and a shooting function, and its sound collecting function and shooting function are stronger than the sound collecting function and shooting function of the terminal. For example, the terminal accessory has a far-field sound collecting function, and the terminal is usually not suitable for a voice interaction from a far distance. In addition, the terminal accessory can also have an infrared control function, and can also charge the terminal. The terminal accessory can be made into a terminal bracket. Usually, the terminal can be placed on the terminal bracket to charge the terminal while acting as "ears" and "eyes" of the terminal to expand the sound collecting function and shooting function of the terminal. This embodiment and the corresponding embodiment of FIG. 1 and the corresponding embodiment of FIG. 2 may be independent from each other, or may be combined, which is not limited in this embodiment. As shown in FIG. 3, the method for controlling the smart home includes the following steps:

Step S301: the terminal accessory acquires third information.

Step S302: the terminal accessory sends the third information to the terminal.

Step S303: the terminal sends the third information to the cloud server.

Step S304: the cloud server generates information to be broadcasted about the smart home according to the third information.

Step S305: the cloud server sends the information to be broadcasted to the terminal.

Step S306: the terminal sends the information to be broadcasted to the terminal accessory.

Step S307: the terminal accessory plays the information to be broadcasted.

Specifically, a connection between the terminal accessory and the terminal is a wired connection or a wireless connection. Take the wired connection as an example: both the terminal accessory and the terminal have USB interfaces, which can be connected by a USB cable. Take the wireless connection as an example: suppose the terminal accessory is a terminal bracket, when the terminal is placed on the terminal accessory, the NFC module of the terminal can read the Bluetooth information configured by the NFC of the terminal accessory, thereby achieving automatic pairing with the terminal accessory. The Bluetooth information includes: a Bluetooth account of the terminal accessory. Alternatively, when the terminal is placed on the terminal accessory, the NFC module of the terminal accessory can read the Bluetooth information configured by the NFC of the terminal, thereby achieving automatic pairing with the terminal accessory. The Bluetooth information includes: a Bluetooth account of the terminal.

Optionally, after the terminal is connected to the terminal accessory, the terminal accessory can activate a wireless charging function, an infrared remote control function, a sound collecting function, and a shooting function.

The terminal can communicate with the cloud server through WiFi, a 2G mobile communication system, a 3G mobile communication system or a 4G mobile communication system or the like.

The terminal can directly control the smart home through its APP, where the smart home may be, for example, a smart air conditioner, a smart refrigerator, etc., and can also indirectly control the smart home through the terminal accessory, for example, control the smart home through the infrared control function of the terminal accessory.

Further, the third information is used to generate information to be broadcasted about the smart home. Alternatively, the third information may be voice information and/or image information input by the user to the terminal accessory. The image information is information about a gesture image and/or information about a facial image shot by the terminal accessory. Correspondingly, in step S301, where the terminal accessory acquires the third information specifically includes: the terminal accessory acquires the voice information through the sound collecting function thereof, and/or the terminal accessory acquires the image information through the shooting function.

The method for controlling the smart home is further illustrated by several examples below:

Optional implementation 7: the terminal accessory acquires voice information, such as "what food is currently in the refrigerator", and the terminal accessory transmits the voice information to the terminal. The terminal sends the voice information to the cloud server through WiFi or a wireless communication network, so that the cloud server parses the voice information, generates a control instruction, and sends the control instruction to the smart refrigerator, and the smart refrigerator shoots the food in the refrigerator according to the control instruction, generates an image, and sends the image to the cloud server, the cloud server parses the image into voice information, and then feeds the voice information to the mobile phone accessory through the mobile phone, and the mobile phone accessory can play the voice information.

In summary, embodiments of the present disclosure provide a method for controlling a smart home, including: the terminal accessory acquires third information; and the terminal accessory sends the third information to the terminal. The terminal sends the third information to the cloud server. The cloud server generates information to be broadcasted about the smart home according to the third information. The cloud server sends the information to be broadcasted to the terminal. The terminal sends the information to be broadcasted to the terminal accessory. The terminal accessory plays the information to be broadcasted, thus improving the utilization rates of the smart homes.

Figure 4:
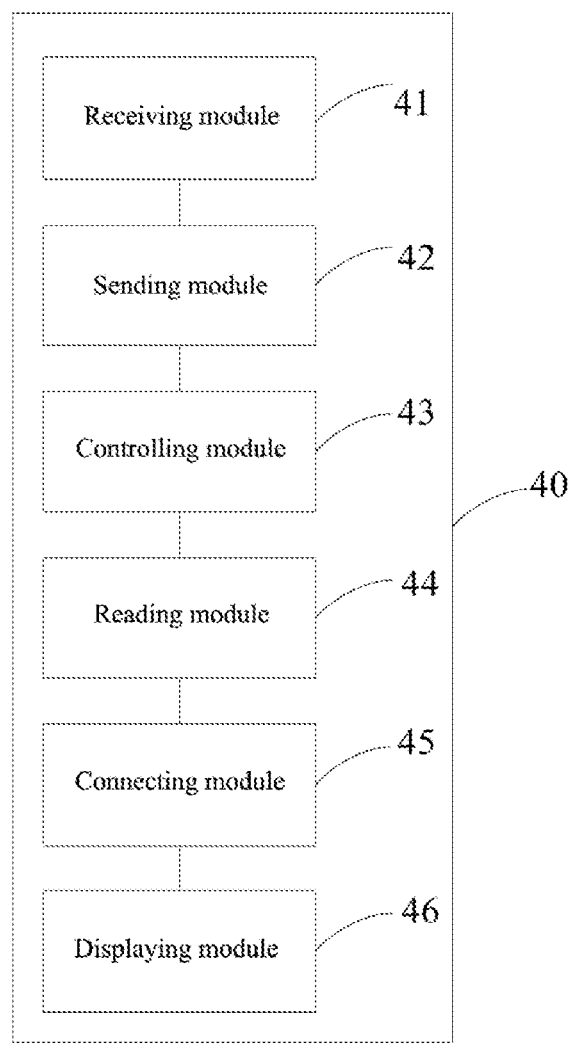
FIG. 4 is a schematic diagram of an apparatus for controlling a smart home 40 according to an embodiment of the present disclosure.

FIG. 4 is a schematic diagram of an apparatus for controlling a smart home 40 according to an embodiment of the present disclosure. The apparatus for controlling the smart home may be part of or all of the terminal. As shown in FIG. 4, the apparatus for controlling the smart home 40 includes a receiving module 41, a sending module 42, and a controlling module 43.

Specifically, the receiving module 41 is configured to receive first information sent by the terminal accessory, and the sending module 42 is configured to send the first information to a cloud server, so that the cloud server generates a control instruction according to the first information, and the receiving module 41 is further configured to receive a control instruction sent by the cloud server; the controlling module 43 is configured to control the smart home according to the control instruction.

Optionally, the first information is voice information and/or image information; the image information is information about a gesture image and/or information about a facial image shot by the terminal accessory.

Optionally, the control module 43 is specifically configured to send the control instruction to the terminal accessory, so that the terminal accessory controls the smart home according to the control instruction.

Optionally, the control module 43 is specifically configured to turn on or turn off the smart home according to the control instruction.

Optionally, a connection between the terminal accessory and the terminal is a wired connection or a wireless connection.

Optionally, the wireless connection is a Bluetooth connection.

Optionally, the device for controlling the smart home further includes:
a reading module 44, configured to read Bluetooth information of the terminal accessory;
a connecting module 45, configured to connect to the terminal accessory according to the Bluetooth information of the terminal accessory.

Optionally, the device for controlling the smart home further includes: a displaying module 46;
the receiving module 41 is further configured to receive second information sent by the terminal accessory;
the sending module 42 is further configured to send second information to the cloud server, so that the cloud server generates the information to be displayed about the smart home according to the second information;
the receiving module 41 is further configured to receive the information to be displayed;
the displaying module 46 is configured to display the information to be displayed.

Optionally, the receiving module 41 is further configured to receive third information sent by the terminal accessory;
the sending module 42 is further configured to send the third information to the cloud server, so that the cloud server generates information to be broadcasted about the smart home according to the third information;
the receiving module 41 is further configured to receive the information to be broadcasted; and
the sending module 42 is further configured to send the information to be broadcasted to the terminal accessory, so that the terminal accessory plays the information to be broadcasted.

The embodiment of the present disclosure provides an apparatus for controlling a smart home, which can be used to execute the method for controlling the smart home executed on the terminal side in any of the foregoing method embodiments, the content and effect thereof are not described herein again.

Figure 5:
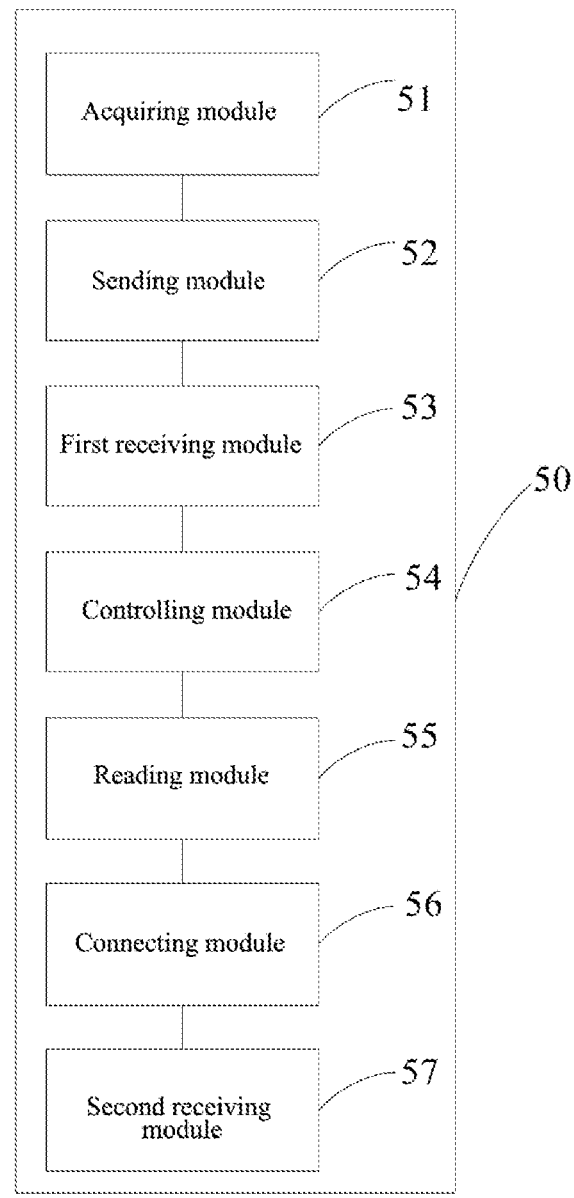
FIG. 5 is a schematic diagram of an apparatus for controlling a smart home 50 according to an embodiment of the present disclosure.

FIG. 5 is a schematic diagram of an apparatus for controlling a smart home 50 according to an embodiment of the present disclosure. The apparatus for controlling the smart home may be part of or all of a terminal accessory. As shown in FIG. 5, the apparatus for controlling the smart home 50 includes:
an acquiring module 51, configured to acquire first information;
a sending module 52, configured to send the first information to the terminal, where the first information is used to generate a control instruction, and the control instruction is used to control the smart home.

Optionally, the first information is voice information and/or image information; the image information is information about a gesture image and/or information about a facial image shot by the terminal accessory.

Optionally, the device for controlling the smart home further includes:

a first receiving module 53, configured to receive a control instruction sent by the terminal;

a controlling module 54, configured to control the smart home according to the control instruction.

Optionally, the control module 54 is specifically configured to: if the smart home is a smart home that can be remotely controlled by infrared, control the smart home through an infrared function of the terminal accessory according to the control instruction.

Optionally, a connection between the apparatus and the terminal is a wired connection or a wireless connection.

Optionally, the wireless connection is a Bluetooth connection.

Optionally, the device for controlling the smart home further includes:

a reading module 55, configured to read Bluetooth information of the terminal;

a connecting module 56, configured to connect to the terminal according to the Bluetooth information of the terminal.

Optionally, the acquiring module 51 is further configured to acquire second information;

the sending module 52 is further configured to send the second information to the terminal, where the second information is used to generate information to be displayed about the smart home.

Optionally, the apparatus for controlling the smart home further includes: a second receiving module 57;

the acquiring module 51 is further configured to acquire third information.

the sending module 52 is further configured to send the third information to the terminal, where the third information is used to generate the information to be broadcasted about the smart home;

the second receiving module 57 is further configured to receive the information to be broadcasted sent by the terminal, and play the information to be broadcasted.

The embodiment of the present disclosure provides an apparatus for controlling a smart home, which can be used to execute the method for controlling the smart home executed on the terminal accessory side in any of the foregoing method embodiments, the content and effects thereof are not described herein again.

Figure 6:
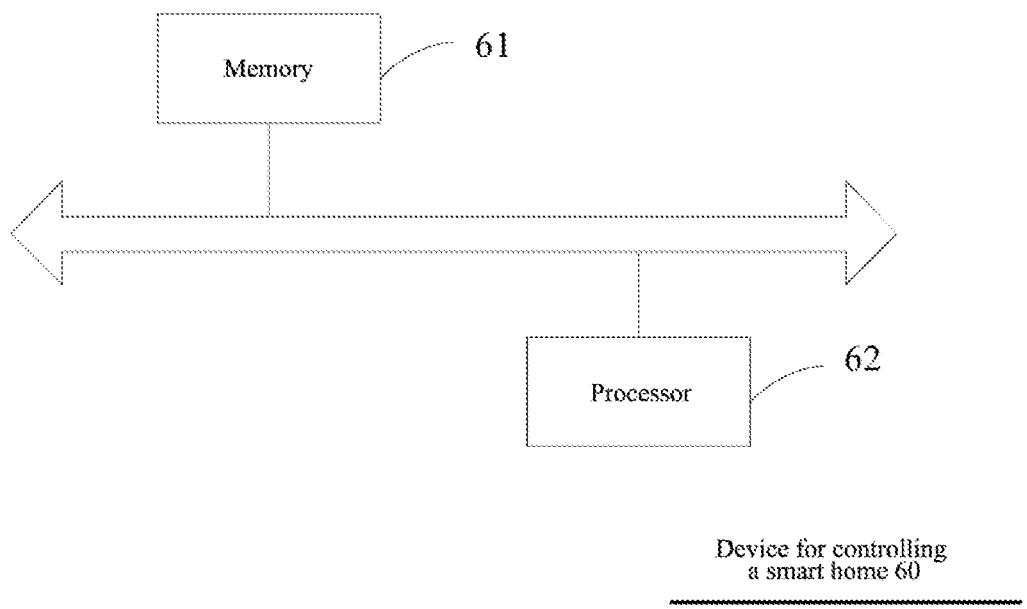
FIG. 6 is a schematic diagram of a device for controlling a smart home 60 according to an embodiment of the present disclosure.

FIG. 6 is a schematic diagram of a device for controlling a smart home 60 according to an embodiment of the present disclosure. The device for controlling the smart home may be a terminal. As shown in FIG. 6, the device for controlling the smart home 60 includes a memory 61 and a processor 62.

The memory 61 is configured to store computer instructions.

The processor 62 is configured to execute the computer instructions stored in the memory 61 to implement the method for controlling a smart home executed on the terminal side.

The embodiment of the present disclosure provides a device for controlling a smart home, which can be used to perform the method for controlling the smart home performed on the terminal side in any of the foregoing method embodiments, the content and effects thereof are not described herein again.

Figure 7:
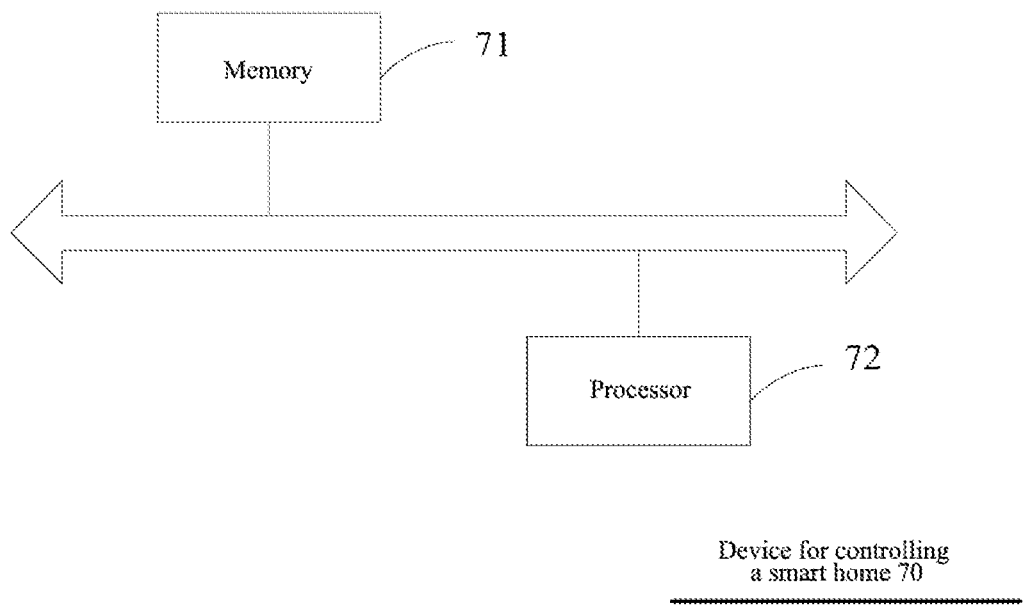
FIG. 7 is a schematic diagram of a device for controlling a smart home 70 according to an embodiment of the present disclosure.

FIG. 7 is a schematic diagram of a device for controlling a smart home 70 according to an embodiment of the present disclosure. The device for controlling the smart home may be a terminal. As shown in FIG. 7, the device for controlling the smart home 70 includes a memory 71 and a processor 72.

The memory 71 is configured to store computer instructions.

The processor 72 is configured to execute the computer instruction stored in the memory 71 to implement a method for controlling a smart home executed on the terminal accessory side.

The embodiment of the present disclosure provides a device for controlling a smart home, which can be used to perform the method for controlling the smart home performed on the terminal accessory side in any of the foregoing method embodiments, the content and effects thereof are not described herein again.

Figure 8:
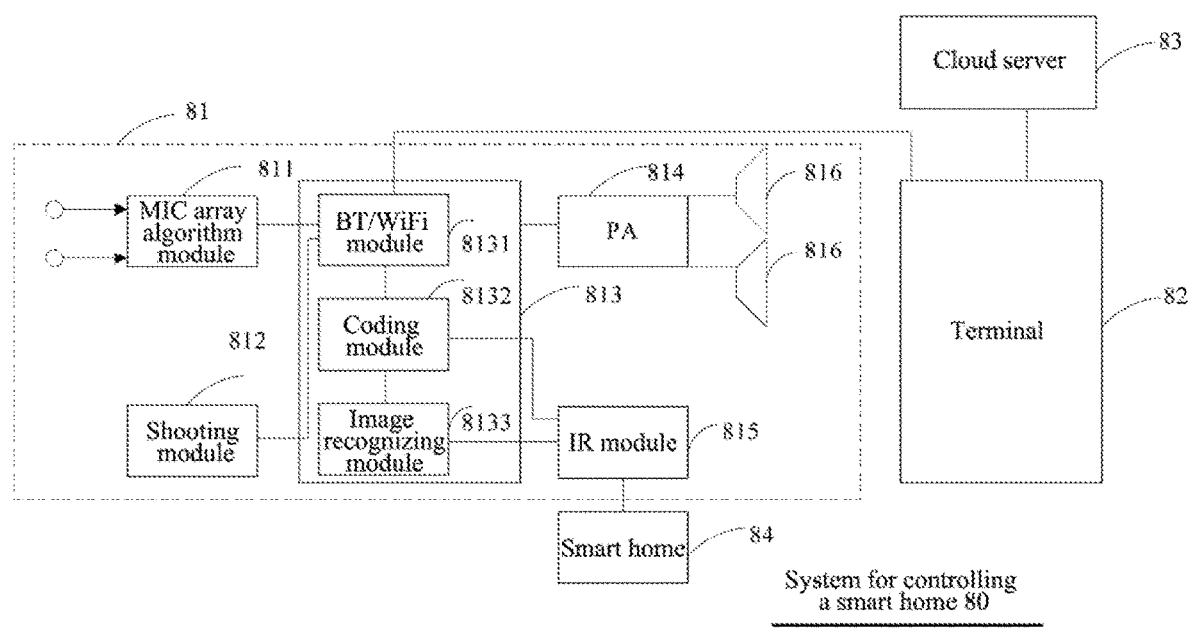
FIG. 8 is a schematic diagram of a system for controlling a smart home 80 according to an embodiment of the present disclosure.

FIG. 8 is a schematic diagram of a system for controlling a smart home 80 according to an embodiment of the present disclosure. The system for controlling the smart home includes a terminal accessory 81 and a terminal 82. Optionally, the system 80 may further include: a cloud server 83 and a smart home 84.

The terminal accessory 81 may include: a microphone (MIC) array algorithm module 811, a shooting module 812, a processor 813, an amplifier (PA) 814, an integrated power drive circuit (IR) module 815, and a speaker 816, where the processor 813 includes: a Bluetooth (BT) or WiFi module 8131, a coding module (CODE C) 8132, and an image recognizing module 8133. The connections between the modules are as shown in FIG. 8.

Figure 9:
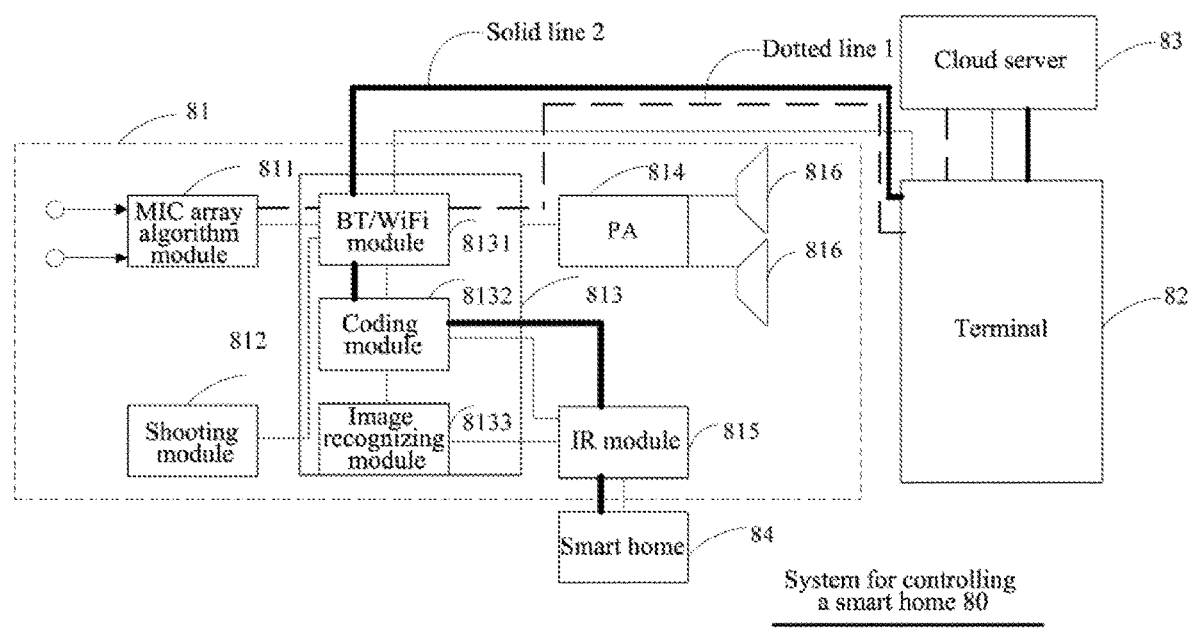
FIG. 9 is a schematic diagram of data transmission based on a system for controlling a smart home according to an embodiment of the present disclosure.

The function of each module and the data transmission between the modules are described below in conjunction with the system for controlling the smart home shown in FIG. 8:

FIG. 9 is a schematic diagram of data transmission based on a system for controlling a smart home according to an embodiment of the present disclosure. As shown in FIG. 9, the MIC array algorithm module 811 acquires voice information, such as "turn on smart home", and transmits the voice information to the BT/WiFi module 8131, the BT/WiFi module 8131 transmits the voice information to the terminal 82, and the terminal 82 sends the voice information to the cloud server 83 via WiFi or a wireless communication network, so that the cloud server 83 parses the voice information, generates a control instruction and sends the control instruction to the terminal 82, the terminal 82 sends the control instruction to the BT/WiFi module 8131, and the BT/WiFi module 8131 sends the control instruction to the coding module 8132, the coding module 8132 performs coding according to the control instruction and sends a result of the coding to the IR module 815, which turns on the smart home 84 through its infrared function. Here, a dotted line 1 in FIG. 9 represents data transmission from the MIC array algorithm module 811 to the cloud server 83, and a solid line 2 represents data transmission from the cloud server 83 to the MIC array algorithm module 811.

Figure 10:
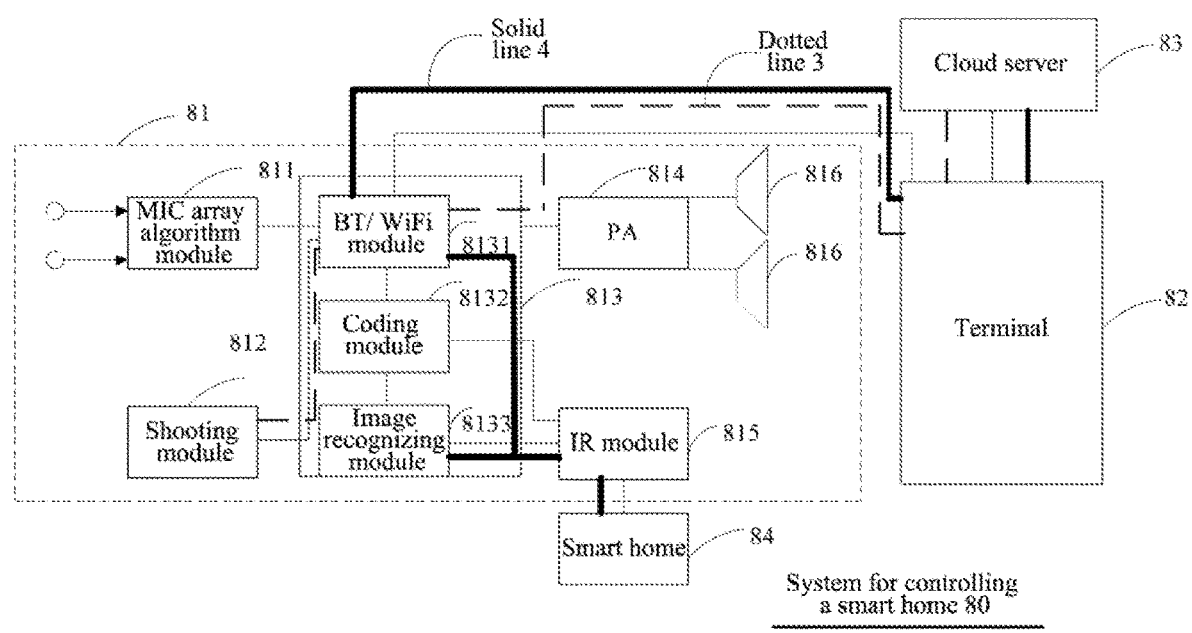
FIG. 10 is a schematic diagram of data transmission based on a system for controlling a smart home according to another embodiment of the present disclosure.

FIG. 10 is a schematic diagram of data transmission based on a system for controlling a smart home according to another embodiment of the present disclosure. As shown in FIG. 10, the shooting module 812 shoots a user's gesture, generates an image about the user's gesture, and transmits the image to the BT/WiFi module 8131, the BT/WiFi module 8131 transmits the image to the terminal 82, and the terminal 82 sends the image to the cloud server 83 via WiFi or a wireless communication network, so that the cloud server 83 parses the image, generates a control instruction, and sends the control instruction to the terminal 82, the terminal 82 sends the control instruction to the BT/WiFi module 8131, and the BT/WiFi module 8131 sends the control instruction to the image recognizing module 8133, and the image recognizing module 8133 performs image recognition according to the control instruction, and sends a result of the image recognition to the IR module 815, which turns on the smart home 84 through its infrared function. Here, in FIG. 10, a dotted line 3 represents data transmission from the shooting module 812 to the cloud server 83, and a solid line 4 represents data transmission from the cloud server 83 to the shooting module 812.

The data transmission process based on the system for controlling the smart home provided by another embodiment of the present disclosure may refer to FIG. 9 and FIG. 10. On the one hand, the MIC array algorithm module 811 acquires voice information, such as "turn on smart home", and transmits the voice information to the BT/WiFi module 8131, the BT/WiFi module 8131 transmits the voice information to the terminal 82, and the terminal 82 sends the voice information to the cloud server 83 through WiFi or the wireless communication network, and the shooting module 812 shoots a user's gesture to generate an image about the user's gesture and transmits the image to the BT/WiFi module 8131, and the BT/WiFi module 8131 transmits the image to the terminal 82, and the terminal 82 transmits the image to the cloud server 83 through WiFi or the wireless communication network, so that the cloud server 83 parses the image and the voice information, generates a control instruction, and sends the control instruction to the terminal 82, the terminal 82 sends the control instruction to the BT/WiFi module 8131, and the BT/WiFi module 8131 sends the control instruction to the coding module 8132. The coding module 8132 performs coding according to the control instruction, and sends a result of the coding to the IR module 815, and the BT/WiFi module 8131 also sends the control instruction to the image recognizing module 8133, the image recognizing module 8133 performs image recognition according to the control instruction, and sends a result of the image recognition to the IR module 815, the IR module 815 turns on the smart home 84 through its infrared function.

The embodiments of the present disclosure provide a system for controlling a smart home, which includes a terminal and a terminal accessory. For the content and the effect regarding the terminal and the terminal accessory, reference can be made to the method embodiments, and details are not described herein again.

The embodiments of the disclosure further provide a storage medium, including: a readable storage medium and computer instructions, where the computer instructions are stored in the readable storage medium; the computer instructions are used to implement the method for controlling a smart home executed on the terminal side, its contents and effects are not described herein again.

The embodiments of the present disclosure further provide a storage medium, including: a readable storage medium and computer instructions, where the computer instructions are stored in the readable storage medium; the computer instructions are used to implement the method for controlling a smart home executed on the terminal accessory side, its contents and effects will not be described herein again.

It should be understood that the processor in the embodiments of the present disclosure may be a central processing unit (CPU for short), or may be other general purpose processors, a digital signal processor (DSP for short), an application specific integrated circuit (ASIC for short). The general purpose processor may be a microprocessor or the processor may be any conventional processor or the like.

The steps of the method disclosed in the embodiments of the present disclosure may be directly implemented as being performed by a hardware processor, or may be performed by a combination of hardware and software modules in the processor.

It will be understood by those skilled in the art that all or part of the steps of implementing the above method embodiments may be performed by hardware related to the program instructions. The aforementioned program can be stored in a computer readable storage medium. The program, when executed, performs the steps including the foregoing method embodiments; and the foregoing storage medium includes: a read-only memory (abbreviation: ROM), a RAM, a flash memory, a hard disk, a solid state hard disk, a magnetic tape, a floppy disk, an optical disc and any combination thereof.

It should be noted that the above embodiments are only used to explain the technical solution of the present disclosure and shall not be construed as limitation; although the present disclosure has been described in detail with reference to the foregoing embodiments, those skilled in the art will understand that the technical solutions described in the foregoing embodiments may be modified, or some or all of the technical features may be equivalently replaced; and the modifications or substitutions do not deviate from the scope of the technical solutions of the embodiments of the present disclosure.

What is claimed is:

1. A method for controlling a smart home, performed by a terminal, the method comprising:
receiving first information sent by a terminal accessory;
sending the first information to a cloud server, so that the cloud server generates a control instruction according to the first information;
receiving the control instruction sent by the cloud server, and controlling the smart home according to the control instruction;
wherein the terminal accessory is a terminal bracket and has a sound collecting function and a shooting function, wherein the sound collecting function of the terminal accessory comprises a far-field sound collecting function and the sound collecting function of the terminal accessory expands a sound collecting function of the terminal, and the shooting function of the terminal accessory expands a shooting function of the terminal;
wherein the first information is image information or the first information is voice information and image information, wherein the image information is at least one of:
information about a gesture image; and
information about a facial image shot through the shooting function of the terminal accessory.

2. The method according to claim 1, wherein the controlling the smart home according to the control instruction comprises:
sending the control instruction to the terminal accessory, so that the terminal accessory controls the smart home according to the control instruction.

3. The method according to claim 1, further comprising:
reading Bluetooth information of the terminal accessory, and connecting to the terminal accessory according to the Bluetooth information of the terminal accessory.

4. The method according to claim 1, further comprising:
receiving second information sent by the terminal accessory;
sending the second information to the cloud server, so that the cloud server generates a control instruction according to the second information and sends the control instruction to the smart home, the smart home shoots an image about the smart home as information to be displayed about the smart home according to the control instruction;
receiving the information to be displayed, and displaying the information to be displayed.

5. The method according to claim 1, further comprising:
acquiring third information sent by the terminal accessory;
sending the third information to the cloud server, so that the cloud server generates a control instruction according to the third information and sends the control instruction to the smart home, the smart home shoots an image about the smart home according to the control instruction and sends the image to the cloud server, the cloud server parses the image into voice information as information to be broadcasted about the smart home;
receiving the information to be broadcasted, and sending the information to be broadcasted to the terminal accessory, so that the terminal accessory plays the information to be broadcasted.

6. The method according to claim 1, wherein the terminal is capable of being placed on the terminal bracket to charge the terminal.

7. A method for controlling a smart home, performed by a terminal accessory, the method comprising:
acquiring first information;
sending the first information to a terminal, wherein the first information is used to generate a control instruction, and the control instruction is used to control the smart home;
wherein the terminal accessory is a terminal bracket and has a sound collecting function and a shooting function, wherein the sound collecting function of the terminal accessory comprises a far-field sound collecting function and the sound collecting function of the terminal accessory expands a sound collecting function of the terminal, and the shooting function of the terminal accessory expands a shooting function of the terminal;
wherein the first information is image information or the first information is voice information and image information, wherein the image information is at least one of:
information about a gesture image; and
information about a facial image shot through the shooting function of the terminal accessory.

8. The method according to claim 7, further comprising:
receiving the control instruction sent by the terminal;
controlling the smart home according to the control instruction.

9. The method according to claim 8, wherein the controlling the smart home according to the control instruction comprises:
if the smart home is a smart home that can be remotely controlled by infrared, controlling the smart home through an infrared function of the terminal accessory according to the control instruction.

10. The method according to claim 7, further comprising:
reading Bluetooth information of the terminal, and connecting to the terminal according to the Bluetooth information of the terminal.

11. The method according to claim 7, further comprising:
acquiring second information;
sending the second information to the terminal, wherein the second information is used to generate information to be displayed about the smart home, wherein the information to be displayed is generated in following way: the cloud server receives the second information sent by the terminal, generates a control instruction according to the second information, and sends the control instruction to the smart home, the smart home shoots an image about the smart home as the information to be displayed according to the control instruction.

12. The method according to claim 7, further comprising:
acquiring third information;
sending the third information to the terminal, wherein the third information is used to generate information to be broadcasted about the smart home, wherein the information to be broadcasted is generated in following way: the cloud server receives the third information sent by the terminal, generates a control instruction according to the third information, and sends the control instruction to the smart home, the smart home shoots an image about the smart home and sends the image to the cloud server, the cloud server parses the image into voice information as the information to be broadcasted and sends the information to be broadcasted to the terminal;
receiving the information to be broadcasted sent by the terminal, and playing the information to be broadcasted.

13. The method according to claim 7, wherein the terminal is capable of being placed on the terminal bracket to charge the terminal.

14. An apparatus for controlling a smart home, comprising a processor and a memory for storing program codes, which, when executed by the processor cause the processor to:
receive first information sent by a terminal accessory;
send the first information to a cloud server, so that the cloud server generates a control instruction according to the first information;
receive a control instruction sent by the cloud server;
control the smart home according to the control instruction;
wherein the terminal accessory is a terminal bracket and has a sound collecting function and a shooting function, wherein the sound collecting function of the terminal accessory comprises a far-field sound collecting function and the sound collecting function of the terminal accessory expands a sound collecting function of the apparatus, and the shooting function of the terminal accessory expands a shooting function of the apparatus;
wherein the first information is image information or the first information is voice information and image information, wherein the image information is at least one of:
information about a gesture image; and
information about a facial image shot through the shooting function of the terminal accessory.

15. The apparatus according to claim 14, wherein the program codes further cause the processor to:
send the control instruction to the terminal accessory, so that the terminal accessory controls the smart home according to the control instruction.

16. The apparatus according to claim 14, wherein the program codes further cause the processor to:
read Bluetooth information of the terminal accessory;
connect to the terminal accessory according to the Bluetooth information of the terminal accessory.

17. The apparatus according to claim 14, wherein the program codes further cause the processor to:

receive second information sent by the terminal accessory;

send the second information to the cloud server, so that the cloud server generates a control instruction according to the second information and sends the control instruction to the smart home, the smart home shoots an image about the smart home as information to be displayed about the smart home according to the control instruction;

receive the information to be displayed;

display the information to be displayed.

18. The apparatus according to claim 14, wherein the program codes further cause the processor to:

receive third information sent by the terminal accessory;

send the third information to the cloud server, so that the cloud server generates a control instruction according to the third information and sends the control instruction to the smart home, the smart home shoots an image about the smart home according to the control instruction and sends the image to the cloud server, the cloud server parses the image into voice information as information to be broadcasted about the smart home;

receive the information to be broadcasted; and send the information to be broadcasted to the terminal accessory, so that the terminal accessory plays the information to be broadcasted.

\* \* \* \* \*